Oct. 28, 1969

C. P. TYLER 3,475,310

SELF-CLEANING MERCURY ELECTRODE

Filed April 6, 1966

INVENTOR.
CARL P. TYLER,
BY
Kurt S. Myers
ATTORNEY

United States Patent Office 3,475,310
Patented Oct. 28, 1969

3,475,310
SELF-CLEANING MERCURY ELECTRODE
Carl P. Tyler, Baytown, Tex., assignor to Esso Research and Engineering Company
Filed Apr. 6, 1966, Ser. No. 540,572
Int. Cl. B01k 3/06; C22d 1/04
U.S. Cl. 204—195                                  5 Claims

ABSTRACT OF THE DISCLOSURE

In an improved sample cell and mercury electrode combination, the mercury electrode comprises a capillary mercury reservoir in the bottom of the sample cell which provides a small surface of mercury to the sample in the sample cell. A valve means is connected to the capillary mercury reservoir so that alternately the contaminated mercury may be discharged and a fresh supply of mercury provided so that consistent and true readings may be obtained.

---

The present invention relates to electrochemical apparatus. More particularly, the invention is directed to an improved mercury electrode and sample cell which has the advantage of a renewable surface.

The electrochemical apparatus of the present invention may be used as a potentiometric or polarographic apparatus. To obtain accurate and consistent measurements in electrochemical work, it is necessary to have an electrode in contact with the sample which is clean and which will respond consistently. In using the apparatus of the present invention as a potentiometric apparatus, there are distinct advantages in having a stationary electrode which requires no cleaning to maintain proper readings. In the past, platinum electrodes have been used but have required repeated cleaning with reproducibility being dependent on the cleanliness of the electrode.

According to the present invention, there is provided a mercury electrode which easily provides a new surface of mercury.

Another object is to provide a simple mercury electrode having a renewable mercury surface in contact with the sample in a sample cell.

Still another object is to provide a novel combined mercury electrode and sample cell which is rugged in construction in the sense that it will give reproducible and consistent readings while used in the field and with both moving sample streams as well as a stationary sample.

Other objects of the present invention are set forth in the following detailed description.

The present invention may be briefly described as an electrochemical apparatus which comprises a sample cell in combination with the mercury electrode of the present invention. The mercury electrode comprises a capillary mercury reservoir in the bottom of the sample cell which provides a surface of mercury to a sample in the sample cell, a supply means for supplying mercury to the reservoir, discharge means for discharging the mercury reservoir, and means for connecting and disconnecting the supply and the discharge passages to the mercury reservoir.

For further objects and advantages of the present invention, reference is to be had to the following detailed description taken in conjunction with the accompanying drawings in which.

Figure 1:
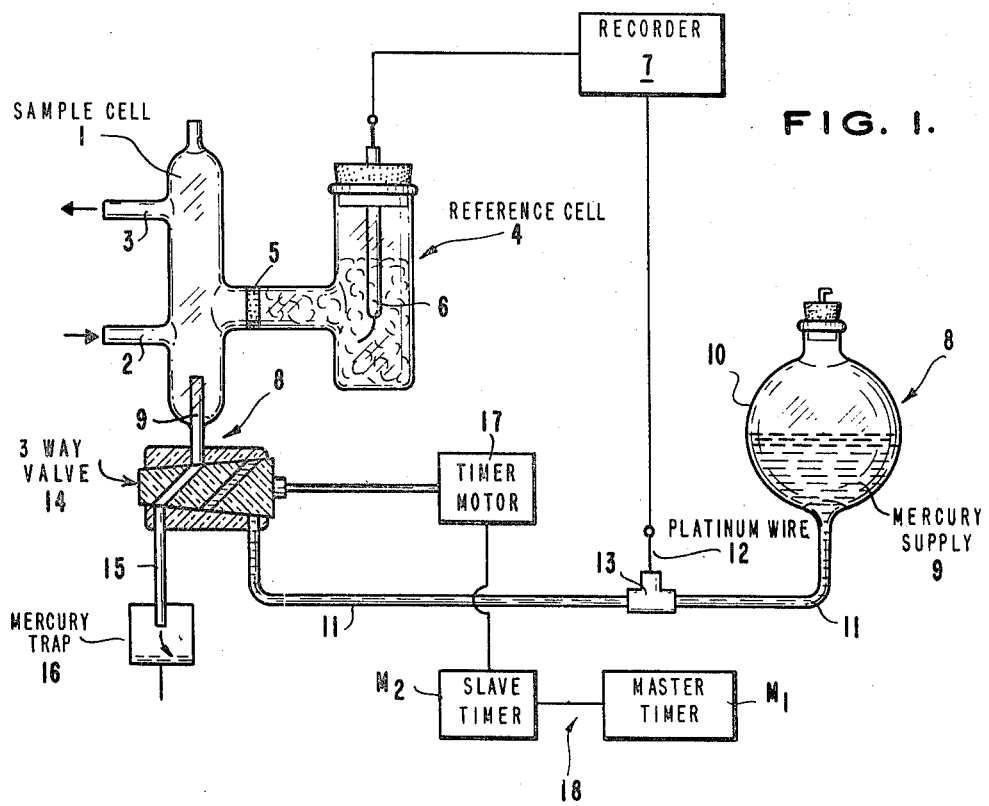
FIGURE 1 is a schematic representation of the electrochemical system of the present invention.

Referring to FIGURE 1, a complete electrochemical apparatus and an exemplary electrical circuit is shown with the preferred mode of the combination of sample cell and mercury electrode of the present invention. Sample cell 1 may have an inlet 2 and an outlet 3 for measuring continuously flowing samples. The sample cell 1 may be part of a potentiometric apparatus which also includes a reference cell 4 separated from the sample cell 1 by an agar plug 5. The reference electrode 6 may be a calomel electrode which is connected in the electrical circuit to a recorder 7. The mercury electrode 8 of the present invention comprises a mercury reservoir 9 consisting of a capillary which extends to the sample cell 1 to provide a surface of mercury to the sample in the cell. The mercury reservoir 9 may extend into the sample cell 1 and be positioned in a number of ways so as to provide a clean surface of mercury to the sample. The mercury electrode 8 has a mercury supply vessel 10 which supplies mercury through line 11. A platinum wire 12 is inserted through a leak-proof fitting 13 into line 11 and is connected to the recorder 7 to complete the electrical circuit. The inlet line 11 is connected to the mercury reservoir 9 by a valve 14 which may be a 3-way valve. The level of mercury in the supply vessel 10 will determine the level of mercury in the mercury reservoir 9. Also connected to the mercury reservoir 9 through valve 14 is a discharge line 15. When valve 14 is operatively connected to line 15, the valve is in the drain position (position shown in FIGURE 1) whereby the mercury is discharged through line 15 to a mercury trap 16. The valve 14 may be automatically actuated by a timer motor 17 and a timer circuit 18 comprising a master timer $M_1$ and a slave timer $M_2$.

The apparatus of the present invention may be used as an automatic oxidation-reduction potential analyzer in a waste water stream or canal system to indicate the presence of abnormal amounts of reducing or oxidizing compounds in the waste water canal such as a refinery effluent canal. Thus, the apparatus can be used to detect abnormal levels of reduced sulfur compounds which should not be discharged into public waters. In utilizing the apparatus of the present invention as an oxidation-reduction potential analyzer or a potentiometric apparatus, a fresh supply of mercury flows by gravity into the reservoir 9 from the supply vessel 10 when valve 14 is rotated 180° from the drain position shown in FIG. 1. Sample flowing through sample cell 1 comes into contact with the fresh mercury surface in the capillary reservoir 9 and with the calomel electrode 6 through the agar bridge 5. The recorder 7 may contain a simple potentiometer to measure the potential between the reference electrode 4 and the mercury electrode 8. After measuring and recording the potential for a period of time, e.g., 15-minute period, the valve 14 is rotated 180° for draining the reservoir 9. The reservoir 9 is allowed to drain for a period of time, e.g., 15-minute period, before the operation is repeated.

Figure 2:
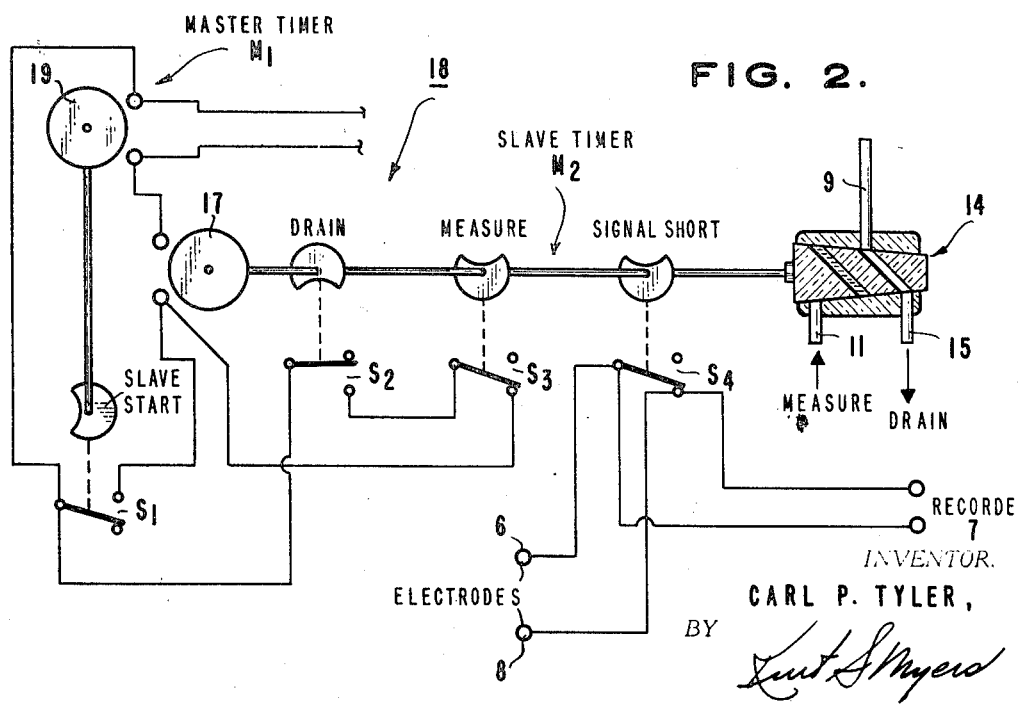
FIGURE 2 is a schematic wiring diagram for automating the sequence of operation.

The foregoing operation may be carried out automatically by using a timer motor 17 which is a part of a timer circuit 18 which is set forth in more detail in FIGURE 2. FIGURE 2 sets forth a schematic wiring diagram for automating the sequence of operation of the apparatus of the present invention. The timer circuit 18 may comprise a master timer circuit $M_1$ consisting of a motor 19 which runs continuously, a switch $S_1$ and a cam on the shaft of motor 19 which actuates switch $S_1$. Switch $S_1$ is connected to the slave timer circuit $M_2$ which comprises motor 17; switches $S_2$, $S_3$, and $S_4$ and the cams which actuate the switches $S_2$, $S_3$, and $S_4$. The master motor 19 has a fixed shaft speed, for example, one revolution per 15 minutes. The motor 17 begins to run only at the command of the master timer circuit $M_1$ and the speed is at a constant rate, for example, about 3½ minutes.

With the valve 14 in the position shown in FIGURE 2, the apparatus of the present invention is automatically operated by the timer circuit 18 wherein motor 19 rotates until the notch of the cam on the shaft of motor 19 closes switch $S_1$ energizing motor 17 of the slave timer circuit $M_2$. The shaft of motor 17 rotates the valve 14. As the shaft rotates, the drain cam closes switch $S_2$ which provides another source of power to motor 17. Thereafter, switch $S_1$ opens but motor 17 continues to run. When the shaft of motor 17 rotates 180°, switch $S_3$ opens stopping rotation of the shaft. At the same time, switch $S_4$ opens unshorting the recorder 17 input leads. Mercury flows by gravity from the supply vessel 10 through valve 14 to the mercury reservoir 9. The recorder measures and records the oxidation reduction potential of the sample, and the recorder pen on the recorder deflects to this value on the chart. The motor 19 which has continued running causes the notch of the cam on the motor 19 shaft to again close switch $S_1$. The shaft of motor 17 rotates valve 14. The measure cam closes switch $S_3$ to keep motor 17 running. Switch $S_1$ opens but motor 17 continues to run. Switch $S_4$ closes after a short period of time shorting the recorder input leads and ends the measuring half cycle. After 180° of rotation of the shaft of motor 17, switch $S_3$ opens stopping rotation. The spent mercury drains out of the reservoir 9 through valve 14 and is discarded. By the master timer $M_1$ and motor 19 which continues to run, the cycle may be repeated continuously. From the foregoing, it can be seen that the apparatus utilizing the mercury electrode and sample cell of the present invention may be used to automatically obtain oxidation-reduction potential data.

It is to be understood that the sample cell 1 and mercury electrode 8 arrangement of the present invention may be used in various combinations with other reference electrodes and various electrical circuits for collecting data other than that of the oxidation-reduction potential.

Figure 3:
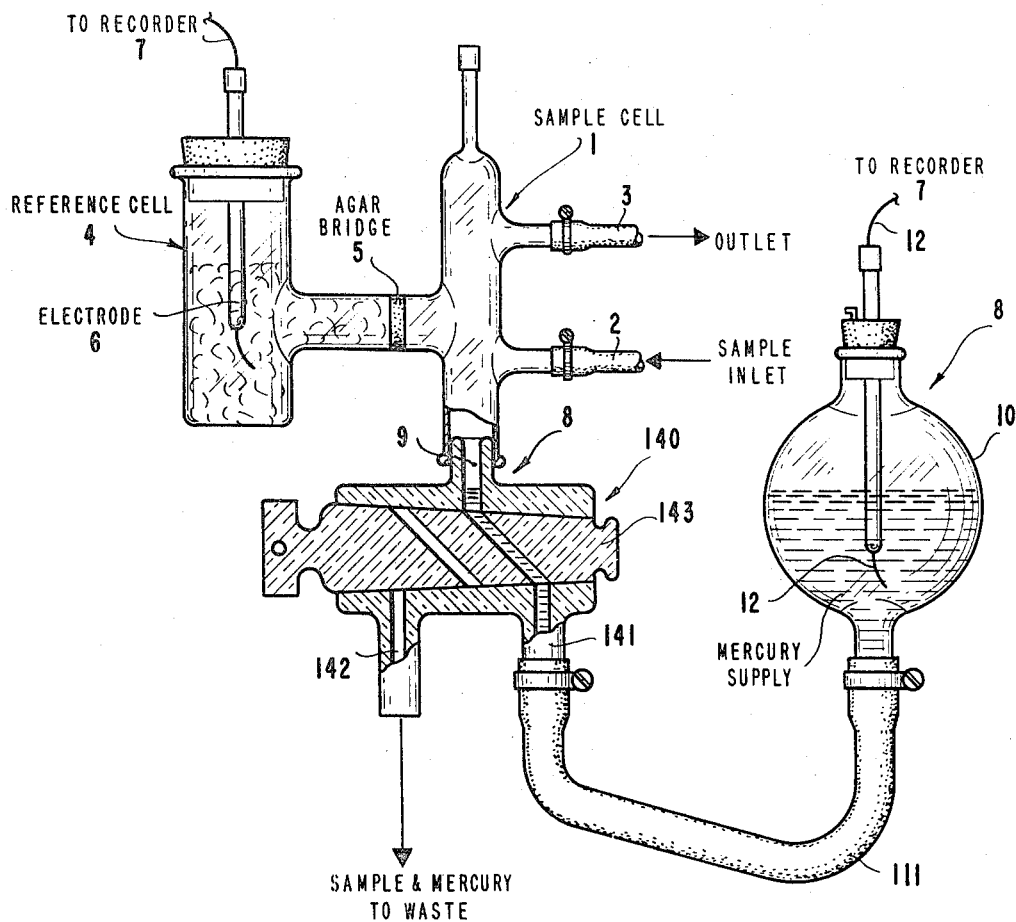
FIGURE 3 is another embodiment of the combination of a sample cell and mercury electrode of the present invention.

Referring to FIGURE 3, another modification of the sample cell and mercury electrode is shown. In describing this modification, the same reference numerals are used to describe the same elements as were used in FIGURE 1. Thus, the potentiometric apparatus includes a sample cell 1 having an inlet 2 and an outlet 3. The mercury electrode 8 includes a mercury supply vessel 10 having a platinum wire 12 emersed in the mercury in the supply vessel 10. The mercury is supplied through a flexible tubing 111 from the supply vessel 10 to a stopcock arrangement 140. The stopcock arrangement 140 is another modification of valve 14 in FIGURE 1. A portion of the stopcock arrangement 140 is a contact with sample cell 1 to provide a mercury reservoir 9. The flexible tubing 111 for supplying mercury is connected to an inlet portion 141 of the stopcock arrangement 140. The stopcock arrangement 140 is also provided with a discharge outlet 142. The valve 143 of the stopcock arrangement 140 may be rotated 180° either by a power coupling or by hand. In the position shown in FIGURE 3, the mercury would fill the mercury reservoir 9 by gravity, assuming a position in the reservoir the same as in the mercury supply vessel 10. Valve 143 is turned 180° and the spent mercury is discharged.

It is obvious that other stopcock arrangements might also be used such as one which would reciprocate to the various positioning of supplying and discharging the mercury to the mercury reservoir rather than having a rotating valve.

The nature and objects of the present invention having been completely described and illustrated and the best mode of practicing the invention set forth, what I wish to claim as new and useful and secure by Letters Patent is:

1. In the combination of a sample cell and a mercury electrode, the improvement which comprises:
    a capillary mercury reservoir which extends into the bottom of said sample cell exposing a surface of mercury to the sample in said sample cell; and
    valve means connected to said reservoir having at least two passageways, one passageway adapted to discharge the mercury in said reservoir and a second passageway adapted to supply fresh mercury.

2. The combination of claim 1 wherein said valve means is a three-way valve.

3. The combination of claim 1 wherein said valve is a stopcock valve.

4. The combination of claim 1 which further comprises:
    a reference cell containing a reference electrode; and
    an agar plug positioned between said sample cell and said reference cell.

5. The combination of claim 1 which further comprises:
    supply means for supplying mercury to said reservoir; and
    discharge means for discharging the mercury from the reservoir.

References Cited
UNITED STATES PATENTS

| | | | |
|---|---|---|---|
| 2,289,589 | 7/1942 | Pomeroy | 204—195 |
| 2,650,256 | 8/1953 | Lingane | 204—195 |
| 2,962,432 | 11/1960 | Tyler | 204—1.1 |
| 3,210,261 | 10/1965 | Tyler | 204—1.1 |
| 3,337,440 | 8/1967 | Nestor | 204—1.1 |

OTHER REFERENCES

Kolthoff et al., "Polarography," 2d. ed., 1952, vol. 1, pp. 392 and 393.

HOWARD S. WILLIAMS, Primary Examiner

T. TUNG, Assistant Examiner

U.S. Cl. X.R.

204—219, 250, 275, 280, 286